(12) United States Patent
Sugiyama

(10) Patent No.: US 9,094,557 B2
(45) Date of Patent: Jul. 28, 2015

(54) PRINT SYSTEM FOR PLACING RESTRICTIONS ON THE USE OF SCANNED DATA

(75) Inventor: Takashi Sugiyama, Okazaki (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 786 days.

(21) Appl. No.: 12/817,633

(22) Filed: Jun. 17, 2010

(65) Prior Publication Data

US 2011/0051182 A1 Mar. 3, 2011

(30) Foreign Application Priority Data

Aug. 28, 2009 (JP) .................................. 2009-197964
May 7, 2010 (JP) .................................. 2010-107297

(51) Int. Cl.
*G06F 3/12* (2006.01)
*G06F 15/02* (2006.01)
*H04N 1/00* (2006.01)
*B41C 1/02* (2006.01)
*G03F 3/08* (2006.01)
*H04N 1/40* (2006.01)
*H04N 1/32* (2006.01)
*H04N 1/44* (2006.01)

(52) U.S. Cl.
CPC ....... *H04N 1/00846* (2013.01); *H04N 1/00326* (2013.01); *H04N 1/00867* (2013.01); *H04N 1/32128* (2013.01); *H04N 1/444* (2013.01); *H04N 1/4413* (2013.01); *H04N 2201/3247* (2013.01); *H04N 2201/3269* (2013.01)

(58) Field of Classification Search
USPC .......... 358/3.28, 1.13, 1.14, 1.15, 451; 718/1, 718/193, 502; 715/201
See application file for complete search history.

(56) References Cited

U.S. PATENT DOCUMENTS

| 7,002,707 | B2 * | 2/2006 | Kujirai ........................... 358/1.9 |
| 7,716,718 | B2 * | 5/2010 | Asada et al. ....................... 726/2 |
| 7,847,958 | B2 * | 12/2010 | Ishikura ....................... 358/1.14 |
| 7,957,034 | B2 * | 6/2011 | Ueda et al. ................... 358/3.28 |
| 8,125,657 | B2 * | 2/2012 | Kato ............................. 358/1.13 |
| 8,275,679 | B2 * | 9/2012 | Kino ............................... 705/34 |
| 2005/0061792 | A1 * | 3/2005 | Kagawa et al. ............... 219/216 |

(Continued)

FOREIGN PATENT DOCUMENTS

| JP | 2000-184178 A | 6/2000 |
| JP | 2004-242029 A | 8/2004 |

(Continued)

OTHER PUBLICATIONS

Japan Patent Office, Office Action for Japanese Patent Application No. 2010-107297 (counterpart Japanese patent application), mailed Mar. 12, 2013.

(Continued)

*Primary Examiner* — Akwasi M Sarpong
(74) *Attorney, Agent, or Firm* — Merchant & Gould PC

(57) ABSTRACT

A printing device includes a printing unit that prints a print-object image corresponding to print data on a recording medium. A placing unit places restriction information on the recording medium if the print data is attached with the first restriction condition. The restriction information is used for attaching a second restriction condition to scanned data that is generated by reading the print-object image printed on the recording medium. The second restriction condition is for placing restrictions on the usage of the scanned data.

9 Claims, 7 Drawing Sheets

(56) References Cited

U.S. PATENT DOCUMENTS

| | | | |
|---|---|---|---|
| 2006/0098234 A1* | 5/2006 | Tani et al. | 358/3.28 |
| 2007/0176000 A1* | 8/2007 | Cattrone et al. | 235/462.01 |
| 2007/0211305 A1 | 9/2007 | Tanida | |
| 2008/0078836 A1* | 4/2008 | Tomita | 235/462.11 |
| 2008/0212827 A1* | 9/2008 | Morita | 382/100 |
| 2008/0224823 A1* | 9/2008 | Lawson et al. | 340/5.8 |
| 2008/0297837 A1* | 12/2008 | Soda | 358/1.15 |
| 2009/0002742 A1 | 1/2009 | Kasatani | |
| 2009/0141313 A1 | 6/2009 | Chiken | |
| 2009/0268259 A1* | 10/2009 | Kikuchi | 358/468 |

FOREIGN PATENT DOCUMENTS

| | | | |
|---|---|---|---|
| JP | 2006-211202 A | | 8/2006 |
| JP | 2006-211264 | * | 8/2006 |
| JP | 2006-211264 A | | 8/2006 |
| JP | 2006-352284 A | | 12/2006 |
| JP | 2007-088720 A | | 4/2007 |
| JP | 2007-243380 A | | 9/2007 |
| JP | 2008-228161 A | | 9/2008 |
| JP | 2008-287689 A | | 11/2008 |
| JP | 2009-006572 A | | 1/2009 |
| JP | 2009-104610 A | | 5/2009 |
| JP | 2009-134549 A | | 6/2009 |

OTHER PUBLICATIONS

Japan Patent Office, Office Action for Japanese Patent Application No. 2010-107297 (counterpart to above-captioned patent application), mailed May 28, 2013.

* cited by examiner

PRINT SYSTEM FOR PLACING RESTRICTIONS ON THE USE OF SCANNED DATA

CROSS REFERENCE TO RELATED APPLICATIONS

This application claims priority from Japanese Patent Applications No. 2009-197964 filed Aug. 28, 2009 and No. 2010-107297 filed May 7, 2010. The entire content of each of these priority applications is incorporated herein by reference.

TECHNICAL FIELD

The present invention relates to a printing device, an image reading device, and a printing system.

BACKGROUND

Classified information may be leaked when an unauthorized person illegally accesses and prints scanned data that was obtained by scanning confidential documents, for example, and Japanese Patent-Application Publication No. 2006-211264 discloses a printing system capable of preventing such classified information leakage. More specifically, a confidential document contains public key information, and an image reading device extracts the public key information when scanning the confidential document and encrypts resultant scanned data by using the extracted public key information. If an unauthorized person illegally accesses the scanned data, a printing device does not print the scanned data unless the scanned data is decrypted.

SUMMARY

However, the above-described printing system is not always capable of managing information satisfactorily.

In view of the foregoing, it is an object of the invention to provide a printing device, an image reading device, and a printing system capable of well managing information printed on a sheet.

In order to attain the above and other objects, the invention provides a printing device including a printing unit that prints a print-object image corresponding to print data on a recording medium, a first determining unit that determines whether the print data is attached with a first restriction condition for placing restrictions on the usage of the print data, and a placing unit that places restriction information on the recording medium when the first determining unit determines that the print data is attached with the first restriction condition. The restriction information is used for attaching a second restriction condition to scanned data that an image reading device generates by reading the print-object image printed on the recording medium. The second restriction condition is for placing restrictions on the usage of the scanned data.

According to another aspect, the present invention provides an image reading device including a reading unit that reads an image printed on a recording medium, a determining unit that determines whether or not partial restriction information is placed on the recording medium, a restoring unit that attempts to restore restriction information based on plural sets of partial restriction information placed on a plurality of recording media, an attaching unit that attaches, based on the restriction information, a restriction condition to scanned data that the reading unit has generated by reading a plurality of images printed on the plurality of recording media if the restoring unit succeeds in restoring the restriction information. The restriction condition is for placing restrictions on the usage of the scanned data.

According to still another aspect, the present invention provides an image reading device including an image reading unit that reads an image printed on a recording medium to generate first scanned data, a determining unit that determines whether the image includes a restriction image representing restriction information, a converting unit that converts the first scanned data to second scanned data corresponding to the image with the restriction image deleted therefrom, and an attaching unit that attaches a restriction condition based on the restriction information to the second scanned data so as to place restrictions on the usage of the second scanned data.

The present invention further provides a printing system including a printing device and an information processing device. The printing device includes a printing unit that prints a print-object image on a recording medium based on print data. The information processing device transmits the print data to the printing device. One of the printing device and the information processing device includes a determining unit that determines whether the print data is attached with a first restriction condition for placing restrictions on the usage of the print data. The printing device further includes a placing unit that places restriction information on the recording medium if the determining unit determines that the print data is attached with the first restriction condition. The restriction information is used for attaching a second restriction condition to scanned data that is obtained by reading the print-object image printed on the recording medium. The second restriction condition is for placing restrictions on the usage of the scanned data.

BRIEF DESCRIPTION OF THE DRAWINGS

The particular features and advantages of the invention as well as other objects will become apparent from the following description taken in connection with the accompanying drawings, in which.

DETAILED DESCRIPTION

Figure 1:
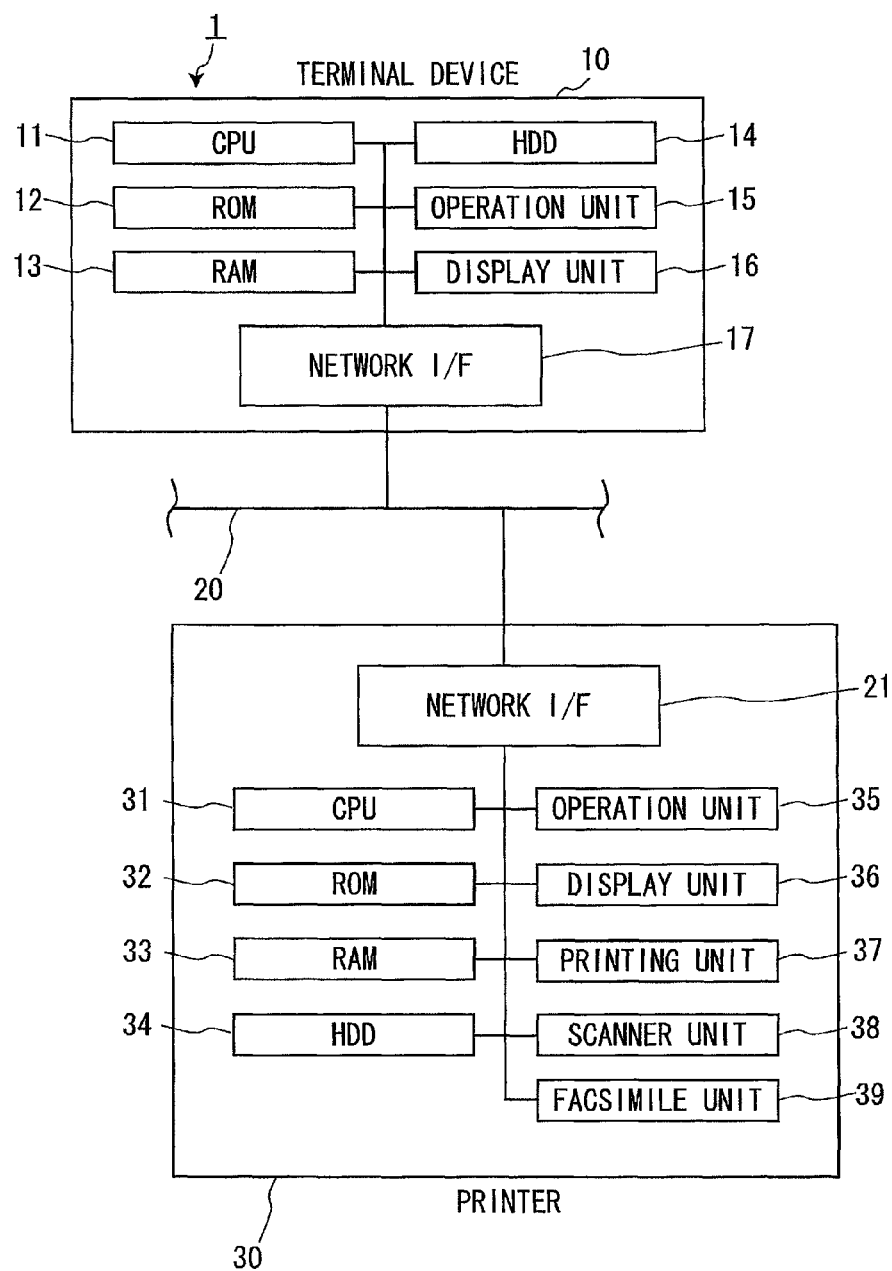
FIG. 1 is a block diagram illustrating a printing system according to a first embodiment of the invention.

Printing systems according to embodiments of the invention will be described while referring to the accompanying drawings wherein like parts and components are designated by the same reference numerals to avoid duplicating description.

<First Embodiment>

As shown in FIG. 1, a printing system 1 according to a first embodiment of the present invention includes a terminal device 10 (such as a personal computer or an information processing device) and a printer 30.

The terminal device 10 includes a CPU 11, a ROM 12, a RAM 13, a hard-disk drive (HDD) 14, an operation unit 15, a display unit 16, and a network interface (I/F) 17. Although not shown in the drawings, the operation unit 15 includes a keyboard, a pointing device, and the like, and the display unit 16 includes a liquid crystal display panel and the like. The network I/F 17 is connected to a communication circuit 20.

The HDD 14 stores an operation system, an application software for generating image data to be printed, and various other programs including a printer driver for controlling the printer 30. The CPU 11 performs overall control of the terminal device 10 by executing various processes based on programs stored in the ROM 12 while storing processed results into the RAM 13.

The printer 30 is a multifunction device capable of performing various functions including a copy function, a scanner function, and a facsimile function, for example, and includes a CPU 31 (corresponding to a first determining unit, an attaching unit, a second determining unit, a placing unit, a discarding unit, and a converting unit), a ROM 32, a RAM 33, a HDD 34, an operation unit 35, a display unit 36, a printing unit 37, a scanner unit 38 (corresponding to an image reading unit), a facsimile unit 39, and a network I/F 21. The ROM 32 stores various programs for controlling the printer 30 and other programs for a printing process and a reading process to be described later. The CPU 31 performs overall control of the printer 30 by executing processes based on the programs stored in the ROM 32 while storing processed results into the RAM 33.

Although not shown in the drawings, the operation unit 35 includes a plurality of buttons and accepts various user's inputs, instructing, for example, to start printing. The display unit 36 includes a liquid crystal display panel and a lamp and is capable of displaying various setting screens and operation status. The printing unit 37 is for printing images on a sheet W (paper sheet, an OHP sheet, or the like, FIG. 2) based on print data in an electrophotographic printing method or an inkjet printing method, for example. The print data may be image data received from the terminal device 10 or an external memory device, scanned data, facsimile data converted into printable format, or the like. The network I/F 21 is connected to the terminal device 10 and other devices through the communication circuit 20 and enables data communications therebetween.

The scanner unit 38 scans images on an original (not shown) to generate scanned data that can be processed at the printing unit 37. The facsimile unit 39 receives facsimile data from a remote facsimile device (not shown).

The printer 30 is capable of restricting the use of information printed on the sheet W by executing the printing process and the reading process described next. The CPU 31 of the printer 30 repeatedly executes each of the printing process and the reading process while the power is ON.

Figure 3:
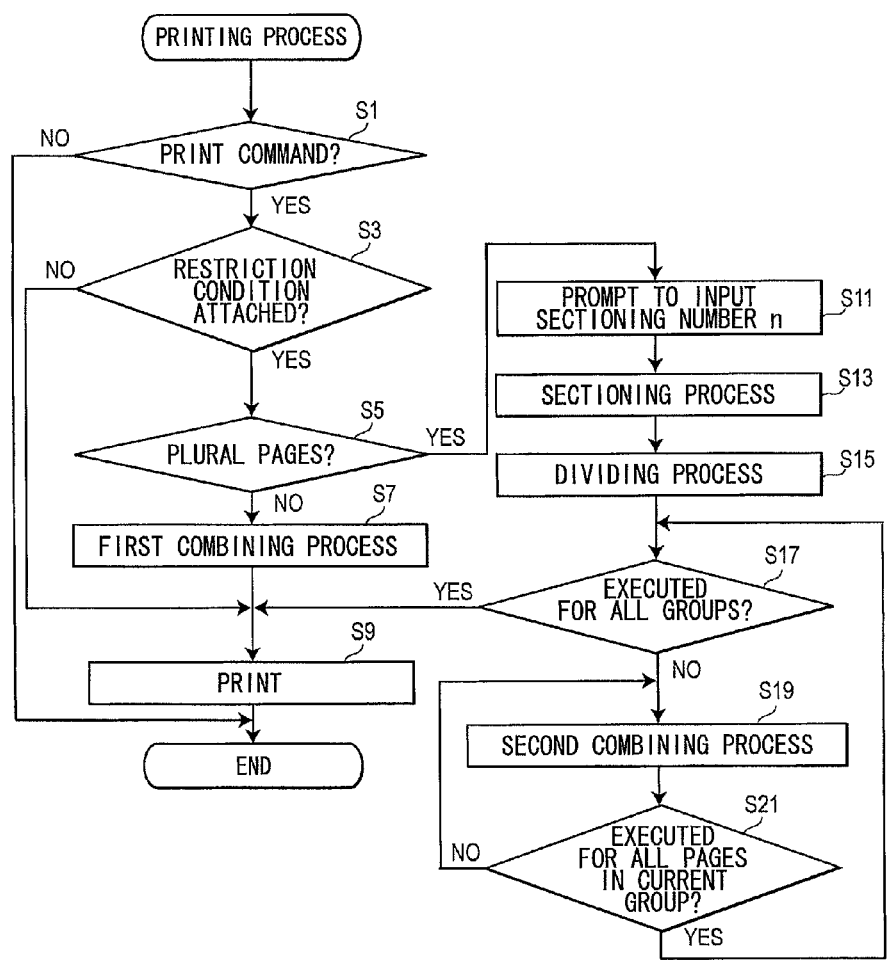
FIG. 3 is a flowchart representing a printing process according to the first embodiment of the invention.

The printing process will be described in detail while referencing the flowchart of FIG. 3.

First, in S1, the CPU 31 determines whether or not any print command is received. A positive determination is made in S1 when any of following conditions (A) to (C) is met.

(A) Image data to be printed is received from the terminal device 10. The terminal device 10 outputs the image data to the printer 30 when a user instructs a PC printing. That is, the PC printing is to execute printing by sending image data to be printed from the terminal device 10 to the printer 30 when a user inputs a print command on the terminal device 10.

(B) An image data is retrieved from an internal memory of the printer 30 (the HDD 34, for example) or an external memory (a USB memory, for example) when a user instructs direct printing. That is, the direct printing is to execute printing by retrieving image data directly from the internal memory or the like without using the terminal device 10 when a user inputs a print command while specifying the image data stored in the internal memory or the like through manipulation on the operation unit 35 of the printer 30.

(C) A facsimile data is received from an external facsimile device.

If a negative determination is made in S1 (S1:No), then the CPU 31 ends the printing process. On the other hand, if a positive determination is made in S1 (S1:Yes), then in S3, the CPU 31 determines whether or not a restriction condition (corresponding to a first restriction condition) is attached to print data (the image data or the facsimile data described above) corresponding to the print command. (The CPU 31 functions as a first determining unit at this time). The restriction condition is for restricting the use of the print data.

Note that the print data attached with the restriction condition is stored in an encrypted form, and the PC printing or the like can be executed for the print data only after a user inputs predetermined key information, such as user identification information or a password, to decrypt the print data. The predetermined key information will be simply referred to as "password" hereinafter. Thus, the user needs to input a valid password when instructing the PC printing or the direct printing with respect to encrypted image data (print data). In other words, print data attached with a restriction condition is sent from the terminal device 10, for example, in a decrypted form.

The CPU 31 determines in S3 that the print data is attached with the restriction condition if, for example, header information of the print data includes a password, and determines that the print data is not attached with the restriction condition if the header information does not include a password.

In this embodiment, the restriction condition is to input a valid password to decrypt the print data, and restricting the usage means prohibiting at least execution of printing based on the print data.

If the restriction condition is not attached to the print data (S3:No), then in S9, the CPU 31 controls the printing unit 37 to print a print-object image on the sheet W based on the print data, and then ends the printing process. On the other hand, if the restriction condition is attached to the print data (S3:Yes), then in S5, the CPU 31 determines whether or not the print data includes image data for a plurality of pages.

If not (S5:No), this means that the print data only includes image data for a single page, and in S7, the CPU 31 performs a first combining process to generate combined-image data by combining the print-object image corresponding to the print data with, as addition images, restriction information and warning information (i.e., by adding the addition images to the print-object image).

As will be described later, the restriction information is information for attaching, to scanned data generated by reading the print-object image printed on a sheet W, restriction condition (corresponding to a second restriction condition) for restricting the use of the scanned data. The restriction condition attached based on the restriction information is equivalent to the restriction condition attached to the print data, and the restriction information includes the password. Note that the restriction information is not limited to letters, but may be a QR code (see FIG. 2) or a barcode.

The warning information is letters, symbols, or graphics indicating that the use of the print-object image printed on the sheet W is restricted. An example of the warning information is "UNAUTHORIZED DUPLICATION/COMPUTERIZATION PROHIBITED" shown in FIG. 2.

Next, in S9, the CPU 31 controls the printing unit 37 to print a combined image, which is a combination of the print-object image and the addition images, on the sheet W based on the combined-image data (the CPU 31 functions as a placing unit at this time), and then ends the printing process.

On the other hand, if a positive determination is made in S5 (S5:Yes), then in S11, the CPU 31 prompts the user to designate a sectioning number n (sectioning pattern). More specifically, the CPU 31 displays a pattern designation screen (not shown) on the display unit 16 of the terminal device 10 if the print command is a PC print command or on the display unit 36 if the print command is other than the PC print command.

Figure 4:
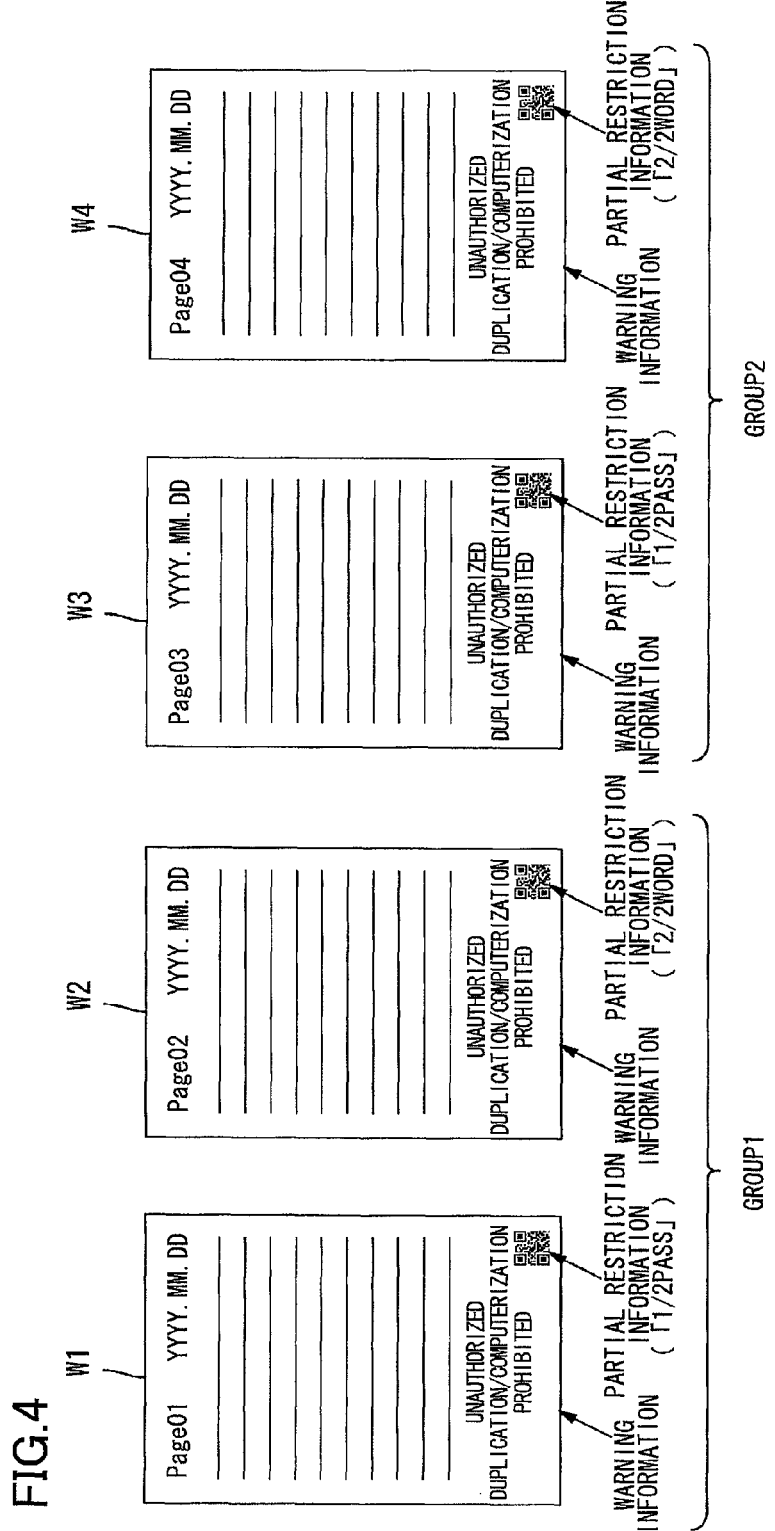
FIG. 4 is an explanatory diagram illustrating results of a partial restriction information adding process according to the first embodiment of the invention.

The pattern designation screen shows a total count of the pages included in the print data and also selections for various sectioning numbers n. If the user selects one of the selections for a desired sectioning number n using the operation unit 15 or 35 (accepting unit), then, in S13, the CPU 31 sections the total count of the pages every n pages starting from the first page. That is, the pages are sectioned into a plurality of groups such that each group includes n pages. For example, as shown in FIG. 4, if the total count of the pages is "4", and if the designated sectioning number n is "2", then the total of four pages are divided into a first group including the first and second pages and a second group including the third and fourth pages.

Next in S15, the CPU 31 extracts a password from header information of the print data, divides the password, and generates n sets of word information. In the example shown in FIG. 4, a password "PASSWORD" is divided and two sets of word information "PASS" and "WORD" are generated.

In S17, the CPU 31 determines whether or not a second combining process described next has been executed for all of the groups. If not (S17:No), then in S19, the CPU 31 executes the second combining process for a first page in a next group. Specifically, in the second combining process, the CPU 31 first generates partial restriction information for the current page by attaching a sectioned-page number and the sectioning number n to the head of the corresponding word information. The sectioned-page number indicates a serial number of the current page within the current group. In the example shown in FIG. 4, "1/2 PASS" is generated as the partial restriction information for page 1, by adding a sectioned-page number "1" and the sectioning number "2" to the head of the word information "PASS". Then, the CPU 31 generates combined image data by combining a print-object image corresponding to image data of the current page with, as addition images, the warning information, the corresponding partial restriction information, the sectioning number n, and the page number of the current page. The total count of the pages may be combined also.

Note that at least the partial restriction information and the sectioning number n are not limited to letters, but may be QR codes or barcodes. In this embodiment, as shown in FIG. 4, a QR code is used as the addition image indicating both the partial restriction information and the sectioning number n.

In S21, the CPU 31 determines whether or not the second combining process has been executed for all of the pages in the current group. If not (S21:No), then the CPU 31 returns to S19 to execute the second combining process for the next page in the current group. On the other hand, if so (S21:Yes), then the CPU 31 returns to S17.

If the second combining process has been executed for the all pages in the all groups (S17:Yes), then the CPU 31 proceeds to S9 to execute the printing, i.e., to control the printing unit 37 to print a combined image based on the combined-image data for each page. As a result, one-page worth of the print-object image and the corresponding addition images (the warning information, the partial restriction information, the page number, and the sectioning number n) are printed on each sheet W (or on either side of the sheet W if both-side printing is designated). This process corresponds to a partial-restriction-information adding process. Then, the CPU 31 ends the printing process.

As a result, as shown in FIG. 4, the print-object image and the warning information are printed on each sheet W. Also, a QR code indicating the partial restriction information "1/2 PASS" and the sectioning number n is printed on first and third sheets W1 and W3, and a QR code indicating the partial restriction information "2/2 WORD" and the sectioning number n is printed on the second and fourth sheets W2 and W4. Note that the warning information in this case is either letters, symbols, or graphics indicating that the solo use of the print-object image printed on the sheet is prohibited. In this manner, solo use of the print-object image can be restricted.

Figure 5:
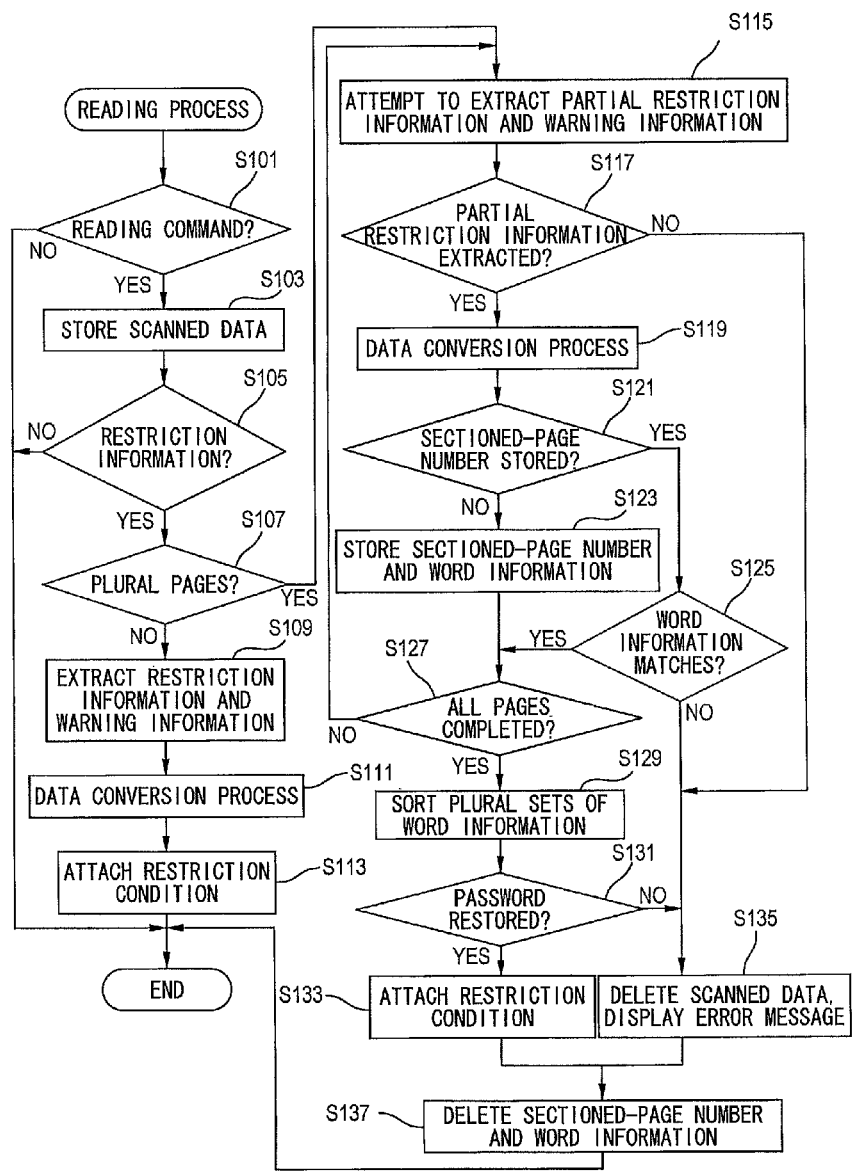
FIG. 5 is a flowchart representing a reading process according to the first embodiment of the invention.

Next, the reading process executed by the CPU 31 of the printer 30 will be described with reference to the flowchart of FIG. 5.

In this process, first in S101, the CPU 31 determines whether or not a reading command is received. If not (S101: No), then the CPU 31 ends the reading process. On the other hand, if a positive determination is made in S101 (S101:Yes), then the CPU 31 proceeds to S103. A positive determination is made in S101 if, for example, the user operates the operation unit 35 to instruct the printer 30 to start reading an original. In S103, the CPU 31 scans an image on the original with the scanner unit 38 to generate scanned data and temporarily stores the scanned data into the HDD 34.

Next, in S105, the CPU 31 executes an image analysis process to determine whether or not a scanned image corresponding to the scanned data includes an image of the restriction information (restriction information or partial restriction information). If not (S105:No), then the CPU 31 ends the reading process. On the other hand, if so (S105:Yes), then in S107 the CPU 31 determines whether or not the scanned data includes image data for a plurality of pages.

If not (S107:No), this means that the scanned data only includes image data for a single page, and in S109 the CPU 31 extracts the restriction information and the warning information from the scanned data. Next, in S111, the CPU 31 converts the scanned data by deleting the image of the restriction information and the warning information from the scanned image (the CPU 31 functions as a converting unit at this time).

Then in S113, the CPU 31 attaches a restriction condition based on the extracted restriction information to the converted scanned data (the CPU 31 functions as an attaching unit at this time). As a result, the scanned data is encrypted, and thus printing of the scanned data is prohibited unless a user inputs a valid password to decrypt the scanned data. Then, the CPU 31 ends the reading process.

On the other hand, if a positive determination is made in S107 (S107:Yes), then in S115 the CPU 31 attempts to extract the partial restriction information, the page number, the sectioning number n, and the warning information from the image data of a current page. Then, in S117, the CPU 31 determines whether or not the CPU 31 has succeeded in extracting the partial restriction information in S115. Note that the CPU 31 recognizes character strings extracted in S115 as the partial restriction information if the sectioning number n is extracted in S115, and makes a positive determination in S117. If the sectioning number n is not extracted in S115, however, the CPU 31 makes a negative determination in S117.

If a negative determination is made in S117 (S117:No), then the CPU 31 proceeds to S135. On the other hand, if a positive determination is made in S117 (S117:Yes), then in S119 the CPU 31 executes a data conversion process to convert the image data of the current page to data (converted scanned data) corresponding to the scanned image of the current page with images of the warning information, the partial restriction information, and the sectioning number n deleted therefrom. Note that an image of the page number may be deleted also. This data conversion process ensures that the images of the partial restriction information and the like are deleted from the scanned image.

Next in S121 the CPU 31 determines whether or not the sectioned-page number included in the partial restriction information extracted in S115 is stored in a predetermined storage area of, for example, the HDD 34. If not (S121:No), then in S123 the CPU 31 stores both the sectioned-page number and the word information included in the partial restriction information extracted in S115 into the predetermined storage area of the HDD 34, and determines in S127 whether or not the data conversion process has been executed for the all pages of the scanned data. If not (S127:No), then the CPU 31 returns to S115 to repeat the process for the next page.

If a positive determination is made in S121 (S121:Yes), then in S125 the CPU 31 determines whether or not the word information included in the extracted partial restriction information matches any word information currently stored in the predetermined storage area of the HDD 34. If so (S125:Yes), then the CPU 31 proceeds to S127. On the other hand, if not (S125:No), then in S135 the CPU 31 deletes all of the scanned data (including the converted scanned data) from the HDD 34 (the CPU 31 functions as a discarding unit at this time) and also controls the display unit 16 or 36 to display an error message notifying the user that reading (computerization) is prohibited, and in S137 deletes all of the sectioned-page number and the word information from the predetermined storage area of the HDD 34, and ends the reading process.

If a positive determination is made in S127 (S127:Yes), then in S129 the CPU 31 sorts the plural sets of word information stored in the HDD 34 in the order of the sectioned-page numbers and creates a single character string. Then, in S131 the CPU 31 determines whether or not the character string matches any of passwords (restriction information) having been previously stored in the HDD 34. In other words, the CPU 31 determines whether or not the CPU 31 has succeeded in restoring the password (restriction information). If not (S131:No), then the CPU 31 proceeds to S135. On the other hand, if so (S131:Yes), then in S133 the CPU 31 creates a single file for all of the converted scanned data, and attaches a restriction condition based on the password to the file. As a result, the converted scanned data is encrypted, and printing based on the converted scanned data is prohibited unless a user inputs the password. Thereafter in S137 the CPU 31 deletes all of the sectioned-page numbers and the word information from the HDD 34, and ends the reading process.

According to the present embodiment, if print data is attached with a restriction condition, restriction information (partial restriction information) is printed on a sheet W together with a print-object image corresponding to the print data, and scanned data generated by scanning the images printed on the sheet W is attached with the restriction condition. Therefore, the usage of the scanned data generated by scanning the images can also be restricted, improving management of information printed on the sheet W.

Also, when print data includes image data for a plurality of pages, a password is divided to generate a plural sets of word information, and each word information is printed on a different sheet W together with a corresponding print-object image. This makes harder for anyone to break the password compared to a case where the whole password is printing on a single sheet W.

Also, if a single password (restriction information) is successfully restored, a restriction condition based on the password is attached to scanned data. Thus, it is possible to improve management of information printed on a sheet W.

Further, because the second combining process to add the addition image of the partial restriction information to the print-object image is executed on group basis, a password can be restored from one of plurality of groups of printed sheets W. Accordingly, it is possible to read images from one of the groups of the printed sheets W and to attach a restriction condition to resultant scanned data, even if images are not read from the all groups of the printed sheets W.

On the other hand, if a password is not restored, then scanned data is deleted. This prevents unlimited use of information printed on the sheet W. A password is not restored if, for example, an image is only read from a single sheet W printed with partial restriction information.

In the above-described reading process, the data conversion process of S119 is executed sequentially for each of a series of sheets W1 to W4 belonging to a single document set, and plural sets of scanned data (converted scanned data) are stored in a single file. However, if a sheet belonging to a different document set is mingled with the series of sheets W1 to W4, then scanned data is all deleted and an error message is displayed (S135). It is determined that a sheet belonging to a different document set is mingled when, for example, partial restriction information including a sectioned-page number "1" and word information differing from "PASS" is extracted while the sectioned-page number "1" and the word information "PASS" are stored in the HDD 34, or when partial restriction information is not extracted in S115 although the scanned data includes image data for a plurality of pages.

<Second Embodiment>

Next, a printing system according to a second embodiment of the invention will be described with reference to FIG. 6. The printing system of this embodiment is the same as the printing system 1 of the above-described first embodiment, but differs in executing a reading process of FIG. 6. Because the processes in S101 to S119 of FIG. 6 are identical to those of the reading process of FIG. 5, description thereof will be omitted.

Figure 6:
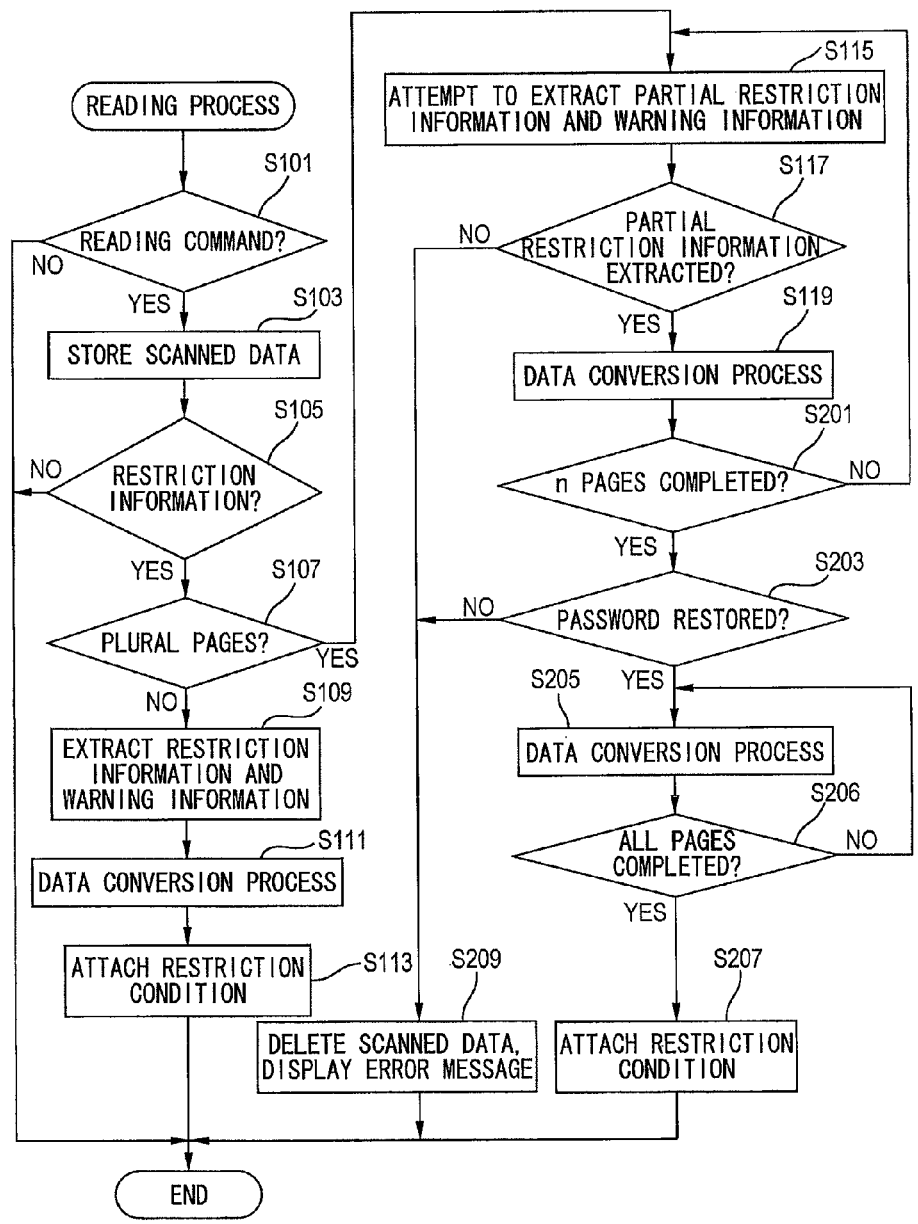
FIG. 6 is a flowchart representing a reading process according to a second embodiment of the invention.

In the reading process of FIG. 6, the CPU 31 determines in S201 whether or not the data conversion process has been executed for n pages. If not (S201:No), then the CPU 31 returns to S115 to repeat the process for the next page. On the other hand, if so (S201:Yes), then in S203 the CPU 31 sorts plural sets of word information included in respective partial restriction information extracted in S115 in the order of sectioned-page numbers to create a single character string (password), and determines whether or not this character string matches one of passwords (restriction information) stored in the HDD 34, for example. In other words, the CPU 31 determines in S203 whether or not predetermined restriction information (password) has been restored. If not (S203:No), then in S209 the CPU 31 deletes the scanned data from the HDD 34 and controls the display unit 16 or 36 to display the error message. Then, the CPU 31 ends the reading process.

On the other hand, if predetermined restriction information is restored (S203:Yes), then in S205 the CPU 31 executes the data conversion process on image data of the next page. Next, in S206 the CPU 31 determines whether or not the data conversion process has been executed for the all pages. If not (S206:No), then the CPU 31 returns to S205 to execute the data conversion process for the next page. On the other hand, if so (S206:Yes), then in S207 the CPU 31 stores the all scanned data (converted scanned data) into a single file and attaches a restriction condition based on the password to the file, and ends the reading process.

In this reading process, if a predetermined password is restored based on partial restriction information extracted from n-page worth of image data belonging to a first group, then the data conversion process is executed for the rest of the pages without determining whether or not a password can be restored from these pages. Then, the converted scanned data for the all pages is stored as a single file, and a restriction condition based on the password restored based on the first group is attached to the file.

<Modifications>

While the invention has been described in detail with reference to the embodiments thereof, it would be apparent to those skilled in the art that various changes and modifications may be made therein without departing from the spirit of the invention.

For example, print data attached with a restriction condition may be any print data as long as the usage of the print data is restricted by prohibiting printing based on the print data unless a valid password is entered. For example, the print data may be print data that anyone is allowed to inspect but not allowed to print without entering the password. Alternatively, the print data may be print data that nobody is allowed to inspect nor to print without entering the password. Still alternatively, the print data may be print data that cannot be printed, edited, deleted, or duplicated. Alternatively, the print data may be print data that anyone other than an authorized user cannot use (at least print). In this case, only the authorized user can use the print data after inputting identification information of the user.

In the above-described embodiments, print data attached with a restriction condition is encrypted, and the usage of the print data is restricted by prohibiting printing based on the print data. However, this is not limitation of the invention, and the restriction condition may be any information indicating that the usage of (access to) the print data and corresponding scanned data is restricted. For example, the restriction condition may be information indicating that only color printing can be performed based on the print data, information indicating that only a predetermined user can inspect, or information indicating that the print data can only be deleted or duplicated.

In the above-described embodiments, the restriction information and the warning information are printed as images on a sheet W. However, the restriction information and the warning information may be printed on a back surface of a sheet W while the print-object image is printed on a front surface of the sheet W. Alternatively, if a sheet W has an electronic chip (FRID), then the restriction information and the warning information may be stored as data into the electronic chip by a predetermined storing device.

In the above-described embodiments, a restriction condition attached to print data is identical to a restriction condition to be attached to scanned data. However, this is not limitation of the invention. For example, different passwords may be used. However, using the same password for decrypting the print data and for decrypting the scanned data as in the above-described embodiments enhances convenience compared to a case where different passwords are used.

Figure 2:
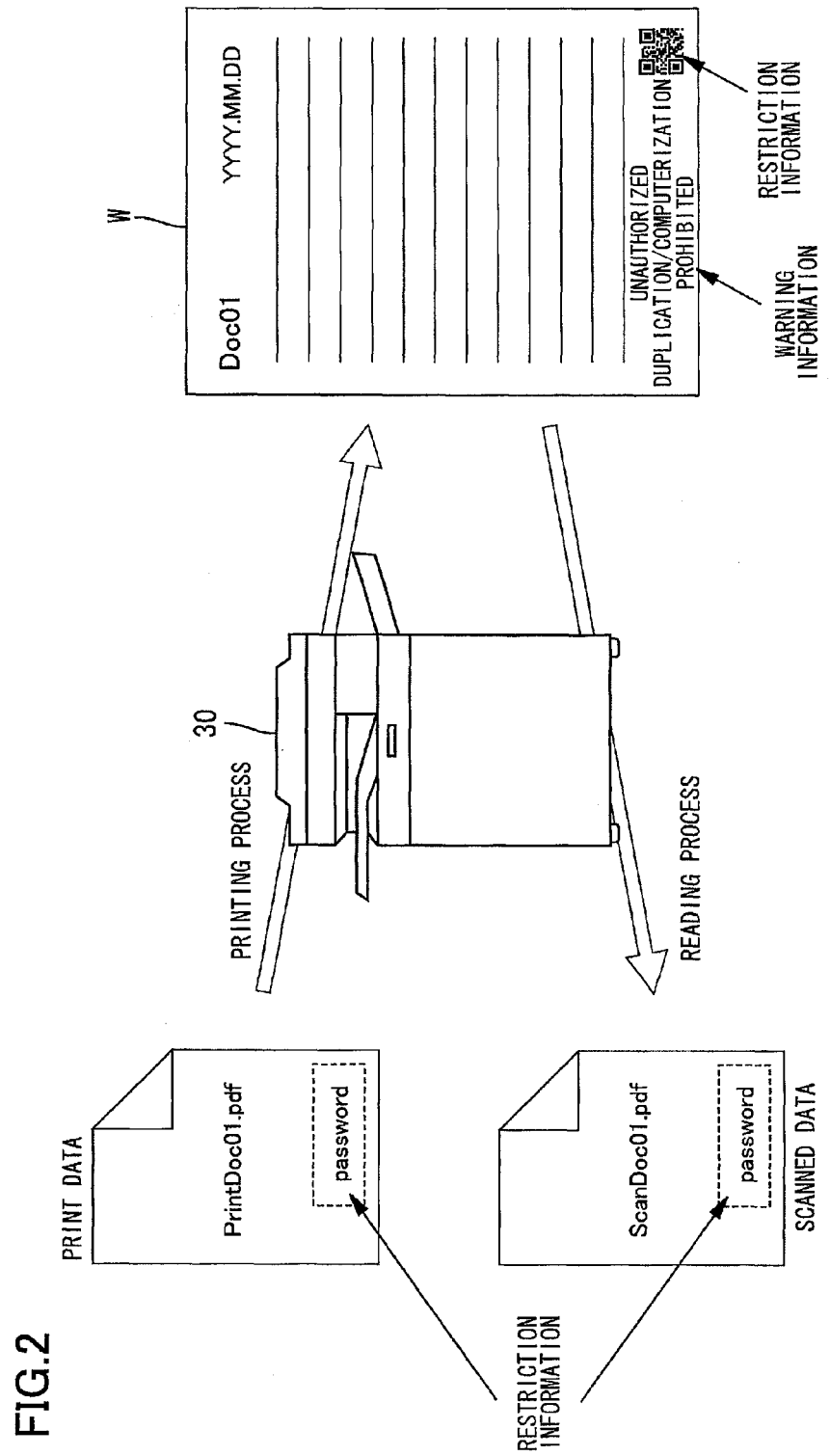
FIG. 2 is an explanatory diagram illustrating a process for restricting the use of information according to the first embodiment of the invention.
Figure 7:
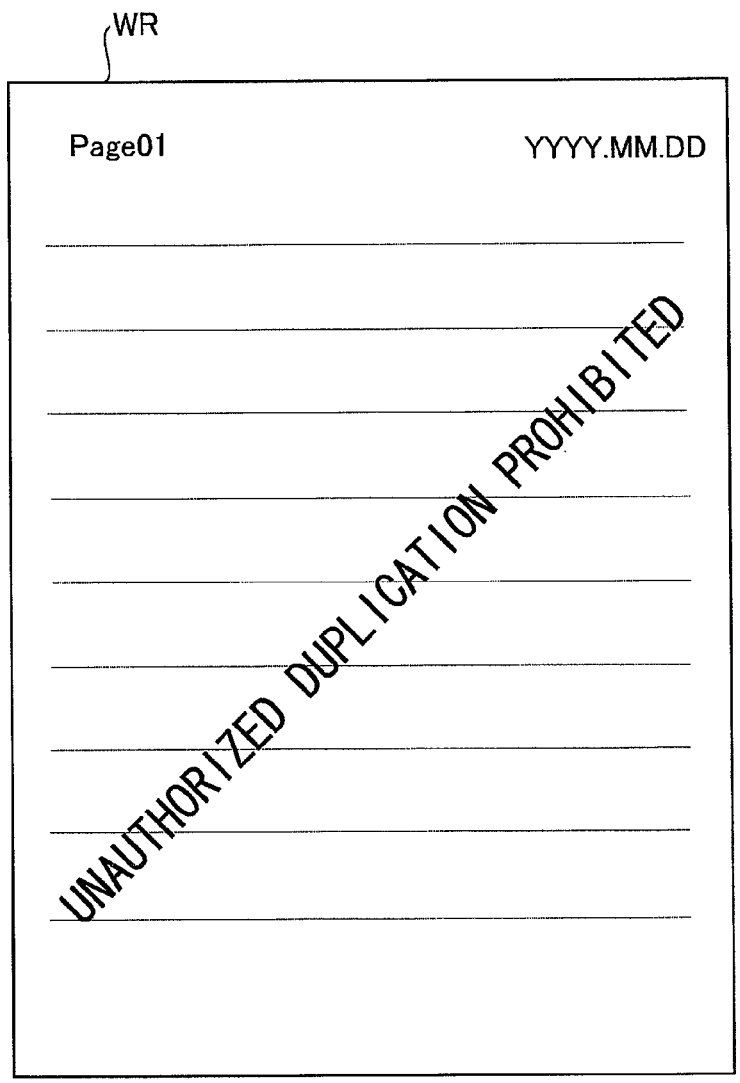
FIG. 7 is a view of a printing result where a warning message is printed according to a modification of the embodiments.

In the above-described embodiments, the scanned data is deleted if a password is not restored. However, the scanned data may be saved even when a password is not restored. In this case, it is conceivable to attach a watermark "UNAUTHORIZED DUPLICATION PROHIBITED" to the scanned data to make the scanned data difficult to utilize. In this case, the printing result based on such scanned data will appear like the one shown in FIG. 7. Because the watermark "UNAUTHORIZED DUPLICATION PROHIBITED" is printed across the entire surface of a sheet WR in FIG. 7, it is harder to utilize such scanned data compared to a case where no such watermark is printed as shown in FIG. 2.

In the above-described embodiments, when print data includes image data for a plurality of pages, the partial restriction information is added to each page. However, the partial restriction information may be only added to some of the pages designated by a user (only important pages, for example).

In the above-described embodiments, pages included in print data are sectioned into groups such that each group includes n pages. However, the pages may be sectioned into groups such that each group includes different number of pages (2 pages, 4 pages, 6 pages, for example), and the process to generate word information and the process to add partial restriction information may be executed on group basis.

In the above-described embodiments, the printing process and the reading process are executed in the printer 30. However, part of the printing process (part or all of S3-S7 of FIG. 3) and part of the reading process (part or all of S103-S137 of FIG. 5, part or all of S103-S209 of FIG. 6) may be executed in the terminal device 10.

What is claimed is:

1. A printing device comprising:
a printing unit;
an image reading unit; and
a controller configured to:
receive first image data including header information, the first image data representing an object image, the header information including a first password;
generate a restriction information image representing the first password;
control the printing unit to print an image on a recording medium, the printed image including the object image and the a restriction information image;
control the image reading unit to read the printed image on the recording medium and generate second image data representing the read image by the image reading unit;
analyze the second image data and determine whether the second image data includes the restriction information image;
generate a second password when it is determined that the second image data includes the restriction information image, the second password being representative of the restriction information image included in the second image data; and
generate third image data by removing the restriction information image from the second image data when it is determined that the second image data includes the restriction information image, the third image data including the object image;
generate restriction information representing the second password; and
generate a second file by adding the restriction information to the third image data, wherein the first password is the same as the second password, wherein the controller is further configured to:
determine whether the first image data included plural sets of object images; and
divide the first password into plural sets of characters when it is determined that the first image data includes plural sets of object images and generate a plurality of partial restriction information images, each of the plurality of partial restriction information images corresponding to each set of characters respectively, and wherein the restriction information image printed on the recording medium is one of the plurality of partial restriction information images.

2. The printing device according to claim 1, wherein the controller is further configured to place a warning information image on each of the plurality of recording media, the warning information image indicating that solo use of each of the plural sets of object images printed on the plurality of recording media is prohibited.

3. The printing device according to claim 1, wherein the controller is further configured to:
accept a user's input indicating a sectioning pattern; and
section the plural sets of object images into a plurality of groups based on the sectioning pattern,
wherein each of the plurality of partial restriction information image corresponds to each of the plurality of groups.

4. The printing device according to claim 1, wherein the restriction information image is printed on a plurality of surfaces of at least one recording medium on which the plural sets of object images are printed.

5. The printing device according to claim 1, wherein the controller is further configured to attempt to generate a second password by combining the plurality of partial restriction information images printed on a plurality of recording media,
wherein the controller is configured to determine whether the partial restriction information image is printed on the recording medium,
wherein the controller is configured to generate the second file representing the plural sets of the object images with the second password if the controller succeeds in generating the second password.

6. The printing device according to claim 5, further comprising a storing unit configured to preliminarily store the first password,
wherein the controller is further configured to generate the second file representing the plural set of object images with the second password if the second password generated by the controller by combining at least two of the plurality of partial restriction information images matches the first password stored in the storing unit.

7. The printing device according to claim 5,
wherein each of the plurality of includes attribute information indicating an attribute of a recording medium on which the partial restriction information image is printed;

wherein the controller is further configured to determine whether plural sets of attribute information included in the plurality of partial restriction information images indicate the same attribute; and
wherein the controller succeeds in generating the second password only when the controller determines that all of the plural sets of attribute information indicate the same attribute.

8. The printing device according to claim 5, wherein the controller is further configured to discard data read by the image reading unit if the second password generated by the controller fails to match the first password stored in the storing unit.

9. A printing system comprising:
a printing device including a printing unit and a printing controller; and
an image reading device including an image reading unit and an image reading controller;
wherein the printing controller is configured to:
receive first image data including header information, the first image representing an object image, the header information including a first password;
generate a restriction information image representing the first password; and
control the printing unit to print an image on a recording medium, the printed image including the object age and the restriction information image,
wherein the image reading controller is configured to:
control the image reading unit to read the printed image on the recording medium and generate second image data representing the read image by the image reading unit;
analyze the second image data and determine whether the second image data includes the restriction information image;
generate a second password when it is determined that the second image data includes the restriction information image, the second password being representative of the restriction information image included in the second image data;
generate a second file by adding the restriction information to the third image data
wherein the first password is the same as the second password,
wherein the printing controller is further configured to:
determine whether the first image data includes plural sets of object images; and
divide the first password into plural sets of characters when it is determined that the first image data includes object images and generate a plurality of partial restriction information images, each of the plurality of partial restriction information images corresponding to each set of characters respectively, and
wherein the restriction information image printed on the recording medium is one of the plurality of partial restriction information images.

\* \* \* \* \*